Jan. 23, 1923.
J. E. GLASS.
STOCK GUARD.
FILED MAY 1, 1922.
1,443,256.
2 SHEETS—SHEET 2.
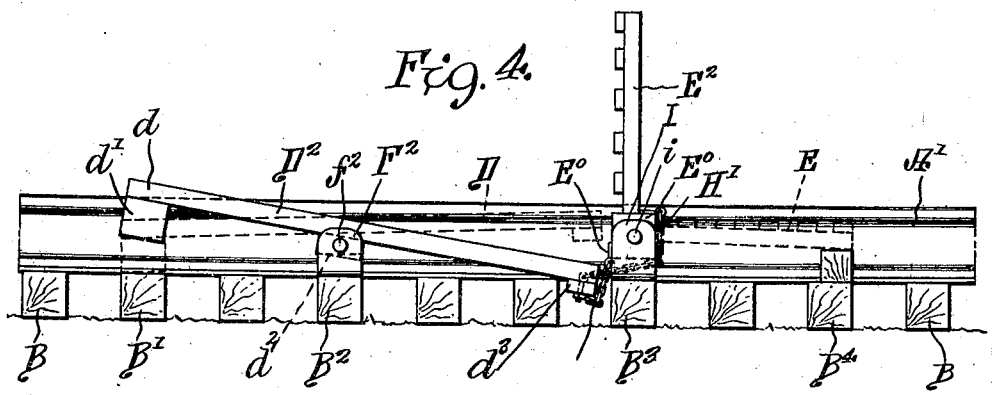
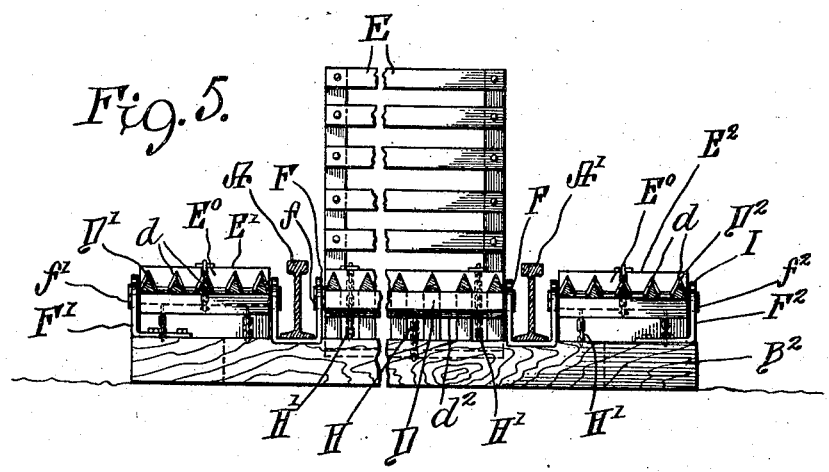
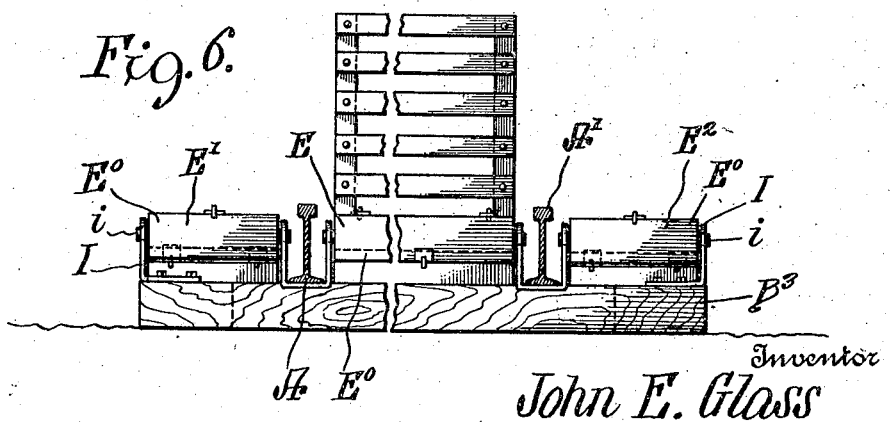
Inventor
John E. Glass
by Wilkinson & Gusta
Attorneys Patented Jan. 23, 1923.

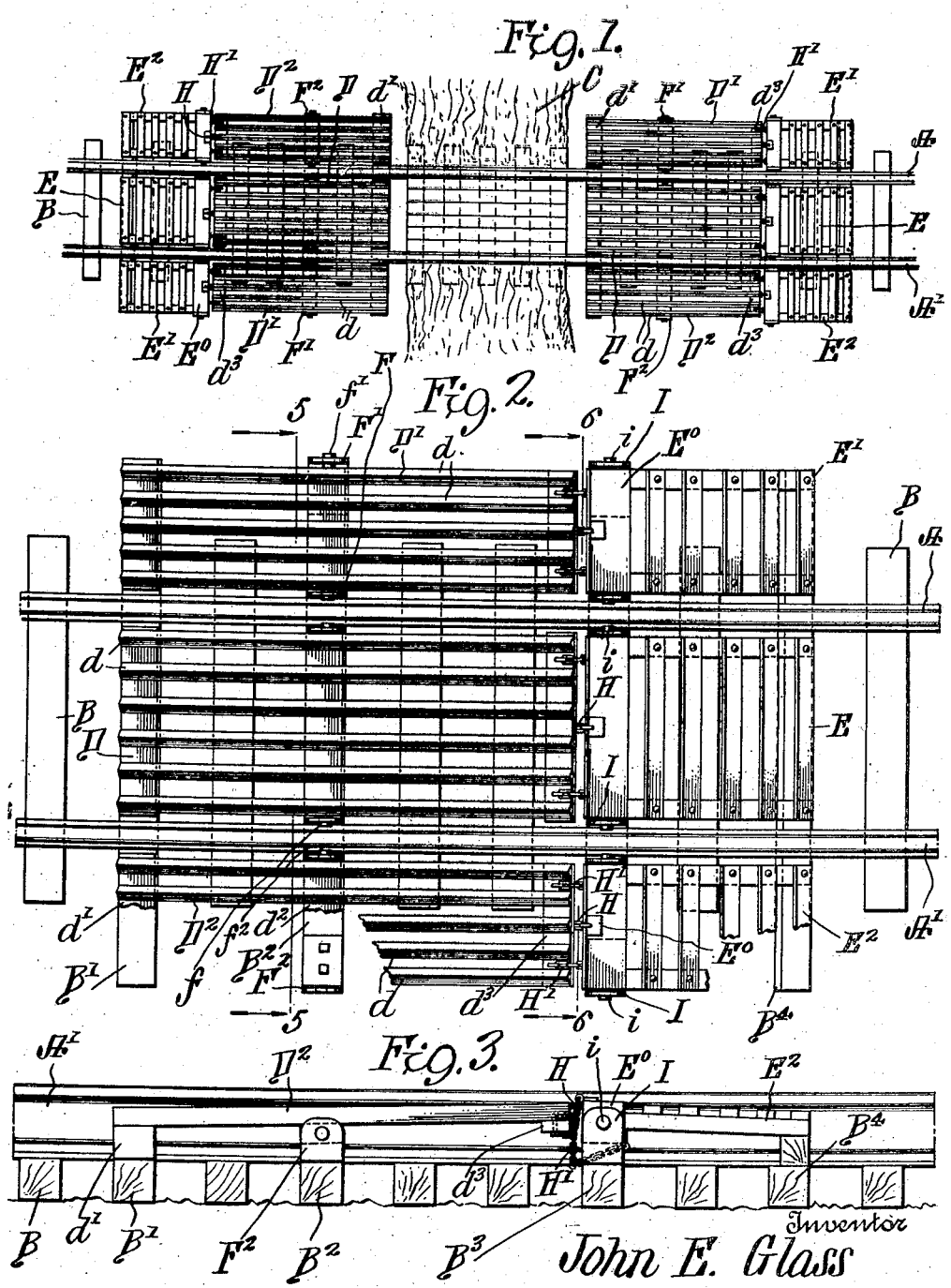

1,443,256

UNITED STATES PATENT OFFICE.

JOHN E. GLASS, OF MARION, KENTUCKY, ASSIGNOR OF ONE-FOURTH TO JAMES A. STIGAR, OF PRINCETON, KENTUCKY, AND ONE-FOURTH TO JAMES H. MAYES, OF MARION, KENTUCKY.

STOCK GUARD.

Application filed May 1, 1922. Serial No. 557,680.

*To all whom it may concern:*

Be it known that I, JOHN E. GLASS, a citizen of the United States, residing at Marion, in the county of Crittenden and State of Kentucky, have invented certain new and useful Improvements in Stock Guards; and I do hereby declare the following to be a full, clear, and exact description of the invention, such as will enable others skilled in the art to which it appertains to make and use the same.

My invention relates to improvements in stock guards for use in connection with railways to prevent cattle, horses, or other animals from wandering along the track where the surface roads cross the railroad.

My invention consists primarily in providing a series of pivoted platforms mounted parallel with the track, which are adapted to tilt when the weight of the animal is imposed thereon, and which in tilting will automatically throw up barriers in the direction in which the animal is moving, which will cause the animal to back off and get clear of the track.

My invention will be more fully understood after reference to the accompanying drawings, in which like parts are indicated by similar reference symbols throughout the several views, and in which:—

Figure 1 shows the railroad crossing the surface road, with two sets of stock guards at each side of the surface road which are so arranged as to prevent the animals from wandering along the track away from the surface road.

Figure 2 is a plan view, on a larger scale, of the right hand stock guard shown in Fig. 1, parts being broken away.

Figure 3 is a side view of the device shown in Fig. 2, with all the gates lowered.

Figure 4 is a similar view to Fig. 3, but with one of the side gates raised.

Figure 5 shows a cross section along the line 5—5 of Fig. 2, and looking in the direction of the arrows, showing the central gate raised; and Figure 6 is a similar view to Fig. 5 taken along the line 6—6 of Fig. 2, and looking in the direction of the arrows.

A and A' represent the rails of the usual or preferred construction and mounted upon suitable cross ties B, which may be also of the usual or preferred construction.

Registering with the stock guards certain of the cross ties are made longer than the others, such as B', $B^2$, $B^3$ and $B^4$, or if desired longer cross timbers may be provided for the purpose, but it will be preferable to simply increase the length of certain of the cross ties as shown.

C represents the surface road crossing the railroad, as shown in Fig. 1, and on each side of the road I show two complete stock guards which are of similar construction; but it will be sufficient to illustrate and describe in detail one only of the same, for instance I have illustrated and described the right hand stock guard shown in Fig. 1. This stock guard comprises a pivoted central platform D, adapted to fit between the rails, and two pivoted side platforms D' and $D^2$ mounted outside and parallel to the rails. These platforms are each provided with a series of parallel slats $d$ which are preferably in the form of an inverted V in cross section, and secured together by suitable cross braces $d'$ $d^2$ and $d^3$.

The central platform D is pivoted on the bolts $f$ carried by the brackets F, mounted on the cross piece $B^2$, and the end platforms D' and $D^2$ are similarly pivoted on bolts $f'$ and $f^2$ in brackets F' and $F^2$ also secured to the cross piece $B^2$.

E is a central swinging gate mounted between the rails, and E' and $E^2$ are parallel side gates outside of the rails, which gates are pivoted near their inner ends to the bolts $i$ carried by the brackets I, secured to the cross beam $B^3$. These gates are provided with large heel pieces $E^0$, which are connected by chains H and H', respectively, to the adjacent edges of the corresponding pivoted platforms D D' and $D^2$, so that when one of the platforms is tilted, as by the weight of the animal, the corresponding gate will be swung to the raised position, and when the weight of the animal is removed from the platform the raised gate will fall, and the chains will assist in returning the parts to the initial position shown in Fig. 3.

The openings between the slats of each platform should be made sufficiently narrow to prevent the feet of a larger animal, such as a horse, cow, mule, or the like, from passing through the crack.

The platforms should be preferably eccentrically pivoted, with the longer parts adjacent the swinging gates, as shown most clearly in Figure 2. This will give the animal more room to stand on the part adjacent the gates, and to facilitate the return of the parts to the initial position the short member of the platform should be provided with a suitable counterweight. This may be accomplished by making the cross piece $d'$ heavier than the cross piece $d^2$, as shown in Fig. 3.

The operation of the device is as follows:

As the animal passes along the surface road, if he attempts to stray on to the railroad he will first tread on the sharp edged slats, and will find the footing uncomfortable and will ordinarily refrain from attempting to follow the railroad; but should he walk on any one of the platforms, as soon as his weight passes the pivots of the platform supporting the animal, the said platform will tilt from the horizontal position shown in Fig. 3 to the inclined position shown in Fig. 4, and the chain H will pull up the corresponding gate and the animal will find his path cut off by said gate. If now the animal attempts to move sideways to the next platform, that platform will also tilt and the corresponding gate will swing up, so that finding himself confronted with the gates the animal will have nothing to do but to back off and return to the surface road.

The chains H and H′ are so arranged that the raised gate will not swing over towards the platform beyond the predetermined position, or preferably the vertical position as shown in Fig. 4. As the animal clears the platform the parts will be automatically restored to the initial position by gravity, as shown in Fig. 3.

It will thus be seen that I provide a cheap, simple and efficient stock guard which will prevent stock from wandering from a beaten road or path along the railroad, thus preventing injury both to the animal and also to any railway train and its passengers that may be passing.

While I have described the invention in its preferred form, I do not wish to limit same to the precise details of construction, as certain modifications might be made in the construction, combination and arrangement of parts which could be used without departing from the spirit of my invention.

Having thus described my invention what I claim and desire to secure by Letters Patent of the United States is:—

A stock guard for use with railways comprising a series of pivoted platforms, each composed of a series of slats in the form of an inverted V in cross section connected by cross braces, the said platforms being separately and eccentrically pivoted in between and alongside the tracks of the railroad, and each platform having its shorter end weighted, in combination with a series of gates, each gate having an enlarged heel pivoted adjacent the outer end of the adjacent platform, with flexible connections between the heel of each gate and the corresponding platform, whereby said gate is raised when the platform is tilted, as by the weight of an animal, and is automatically restored to the horizontal position by said weighted platform end when the animal moves off the platform.

JOHN E. GLASS.